United States Patent
Lin et al.

(10) Patent No.: US 7,303,338 B2
(45) Date of Patent: Dec. 4, 2007

(54) LIGHT GUIDE PLATE WITH HOLES

(75) Inventors: Ching-Huang Lin, Miao-Li (TW);
 Chih-Hung Chang, Miao-Li (TW);
 Song Lu, Shenzhen (CN); Wen-Bin Lin, Shenzhen (CN)

(73) Assignees: Innocom Technology (Shenzhen) Co., Ltd., Shenzhen, Guangdong Province (CN); Innolux Display Corp., Chu-Nan, Miao-Li County (TW)

( * ) Notice: Subject to any disclaimer, the term of this patent is extended or adjusted under 35 U.S.C. 154(b) by 0 days.

(21) Appl. No.: 11/316,721

(22) Filed: Dec. 23, 2005

(65) Prior Publication Data
 US 2006/0146564 A1  Jul. 6, 2006

(30) Foreign Application Priority Data
 Dec. 30, 2004  (CN) .................. 2004 2 0103624

(51) Int. Cl.
 *G02B 6/36* (2006.01)
 *F21V 7/04* (2006.01)
(52) U.S. Cl. ........................................ 385/88; 362/606
(58) Field of Classification Search ............. None
 See application file for complete search history.

(56) References Cited

U.S. PATENT DOCUMENTS

| 5,712,694 | A  | * | 1/1998 | Taira et al. .................. 349/9 |
| 6,883,925 | B2 |   | 4/2005 | Leu et al. |
| 7,053,921 | B2 | * | 5/2006 | Chino .......................... 347/241 |
| 2002/0064037 | A1 | * | 5/2002 | Lee ............................. 362/31 |
| 2003/0150918 | A1 | * | 8/2003 | Nogami et al. ............. 235/454 |

\* cited by examiner

*Primary Examiner*—Tina M Wong
(74) *Attorney, Agent, or Firm*—Wei Te Chung

(57) ABSTRACT

A light guide plate (10) includes a light incident surface (12), a light emitting surface (14) adjoining the light incident surface, a bottom surface (16) opposite to the light emitting surface, and a plurality of holes (18). Each hole has at least one open end terminating at the light emitting surface or the bottom surface. The holes may be through holes or blind holes. When incident light beams reach the holes, the light beams are reflected or refracted in directions toward the light emitting surface. Therefore a distance traveled by a portion of the light beams in the light guide plate is shortened, and the loss of light energy is reduced. This enables the light guide plate to provide a high ratio of light utilization. Additionally, the through holes reduce the weight of the light guide plate. The light guide plate can be generally rectangular or wedge-shaped.

15 Claims, 3 Drawing Sheets

LIGHT GUIDE PLATE WITH HOLES

FIELD OF THE INVENTION

The present invention relates to light guide plates, and especially to a light guide plate typically used for a backlight module of a liquid crystal display.

BACKGROUND

Liquid crystal displays (LCDs) are commonly used as display devices for compact electronic apparatuses, because they not only provide good quality images with little power but are also very thin. The liquid crystals in a liquid crystal display do not emit any light themselves. The liquid crystals have to be lit by a light source so as to clearly and sharply display text and images. Thus, a backlight module for an LCD is generally needed.

A typical backlight module is shown in FIG. 11. The backlight module 200 includes a light guide plate 220, a light source 210, a reflection plate 230, and a diffusion plate 240. The light guide plate 220 includes a light incident surface 222, a light emitting surface 223 adjoining the light incident surface 222, and a bottom surface 224 opposite to the light emitting surface 223. The light source 210 is located adjacent to the light incident surface 222. A plurality of light diffusion dots 226 are arranged at the bottom surface 224 for diffusing light beams from the light source 210, which enables the backlight module 200 to provide a uniform display.

The light beams emitted by the light source 210 enter the light guide plate 220 through the light incident surface 222. Some of the light beams travel a long distance in the light guide plate 220 before emitting out from the light emitting surface 223, which results in loss of light energy. Additionally, some of the light beams may be reflected many times within the light guide plate 220 before emitting out from the light emitting surface 223, which results in further loss of light energy. Thus, the light utilization ratio of the backlight module 200 may be unsatisfactory.

What is needed, therefore, is a light guide plate with an improved light utilization ratio.

SUMMARY

In one embodiment, a light guide plate includes a light incident surface, a light emitting surface adjoining the light incident surface, a bottom surface opposite to the light emitting surface, and a plurality of through holes. Each through hole is slanted at an oblique angle in relation to the bottom surface and has one end terminating at the light emitting surface or the bottom surface.

When incident light beams reach the through holes, the light beams are reflected or refracted in directions toward the light emitting surface. Therefore a distance traveled by a portion of the light beams in the light guide plate is shortened, and the loss of light energy is reduced. This enables the light guide plate to provide a high ratio of light utilization. Additionally, the through holes reduce the weight of the light guide plate.

Other advantages and novel features will become more apparent from the following detailed description of preferred embodiments when taken in conjunction with the accompanying drawings, in which:

DETAILED DESCRIPTION OF PREFERRED EMBODIMENTS

Reference will now be made to the drawings to describe the preferred embodiments in detail.

Figure 1:
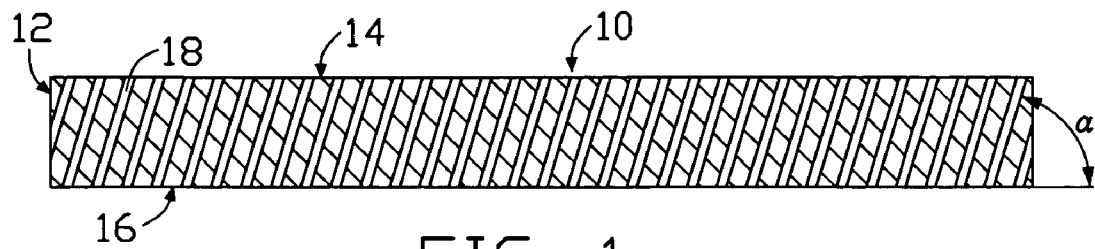
FIG. 1 is a schematic, side cross-sectional view of a light guide plate according to a first embodiment of the present invention.
Figure 2:
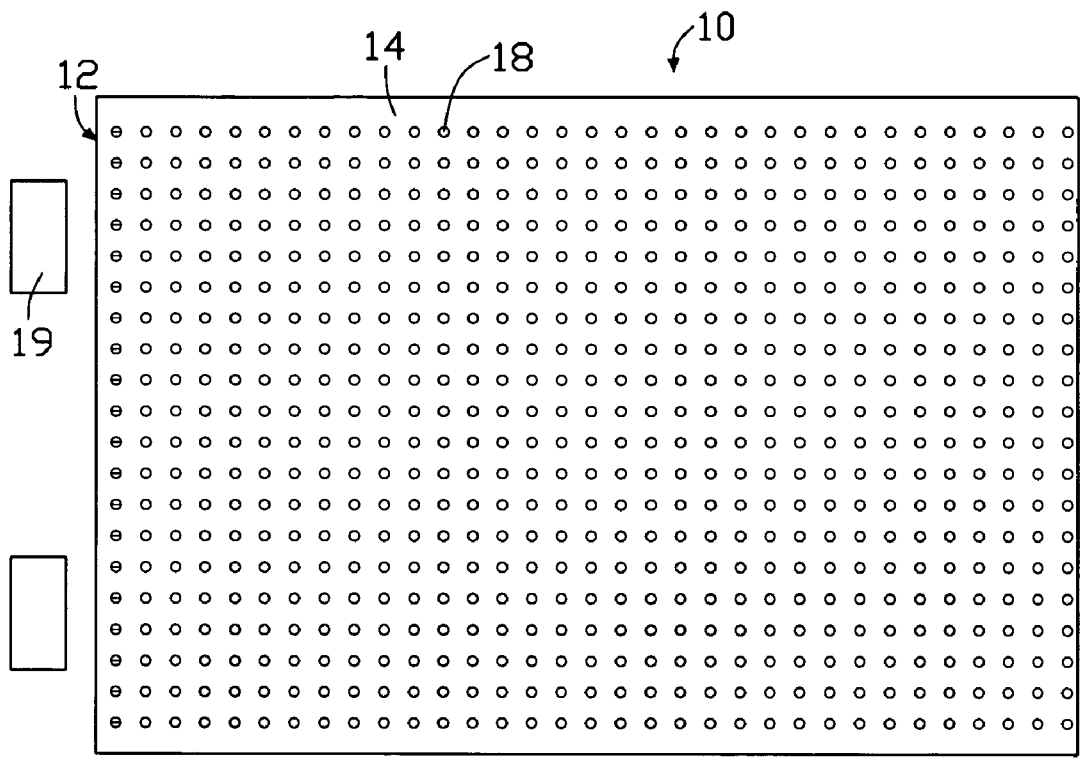
FIG. 2 is a schematic, top plan view of a backlight module which employs the light guide plate of FIG. 1.

Referring to FIG. 1 and FIG. 2, a light guide plate 10 according to a first embodiment of the present invention includes a light incident surface 12, a light emitting surface 14 adjoining the light incident surface 12, and a bottom surface 16 opposite to the light emitting surface 14. The light guide plate 10 is generally rectangular, and further includes a plurality of slanted through holes 18 therein. The holes 18 are parallel to each other, have a same constant diameter, and are spaced from each other a constant pitch. The holes 18 have opposite ends terminating at the light emitting surface 14 and the bottom surface 16 respectively. The holes 18 are substantially column-shaped. An angle α between each of the holes 18 and the bottom surface 16 is in the range between 0 and 90 degrees. In alternative embodiments, the angle α can be in the range between 90 and 180 degrees. The light guide plate 10 can be made from polymethyl methacrylate (PMMA) or polycarbonate (PC).

The holes 18 define a plurality of sections (not labeled) in the light guide plate 10, and these sections can reflect and refract the light beams traveling in the light guide plate 10. Referring to FIG. 2, a backlight module (not labeled) includes the light guide plate 10, and a pair of light sources 19 opposite the light incident surface 12 of the light guide plate 10. When incident light beams enter the light guide plate 10 through the light incident surface 12 and reach the holes 18, a portion of the light beams are reflected or refracted in directions toward the light emitting surface 14. Thus, distances traveled by a portion of the light beams in the light guide plate 10 are shortened, and the loss of light energy is reduced. This results in an improved light utilization ratio for the light guide plate 10. Additionally, the holes 18 reduce the weight of the light guide plate 10.

Figure 3:
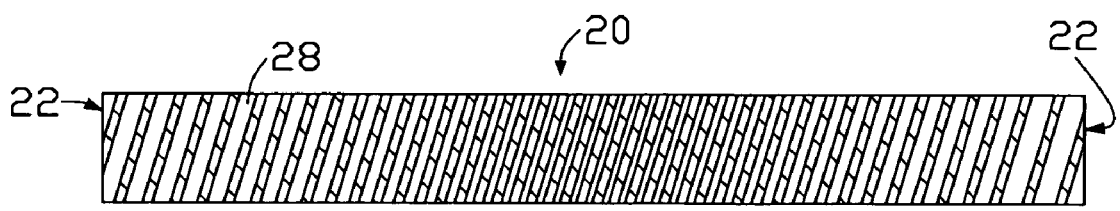
FIG. 3 is a schematic, side cross-sectional view of a light guide plate according to a second embodiment of the present invention.

FIG. 3 is a schematic, side cross-sectional view of a light guide plate according to a second embodiment of the present invention. The light guide plate 20 is similar to the first embodiment. However, the light guide plate 20 includes two opposite light incident surfaces 22. Diameters of a plurality of through holes 28 in the light guide plate 20 progressively decrease in size with increasing distance away from each of the light incident surfaces 22.

Figure 4:
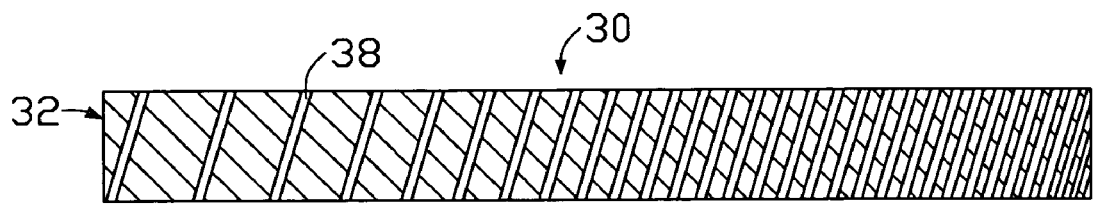
FIG. 4 is a schematic, side cross-sectional view of a light guide plate according to a third embodiment of the present invention.

FIG. 4 is a schematic, side cross-sectional view of a light guide plate according to a third embodiment of the present invention. The light guide plate 30 is similar to the first embodiment. However, a pitch between two adjacent through holes 38 in the light guide plate 30 progressively decreases with increasing distance away from a light incident surface 32.

Figure 5:
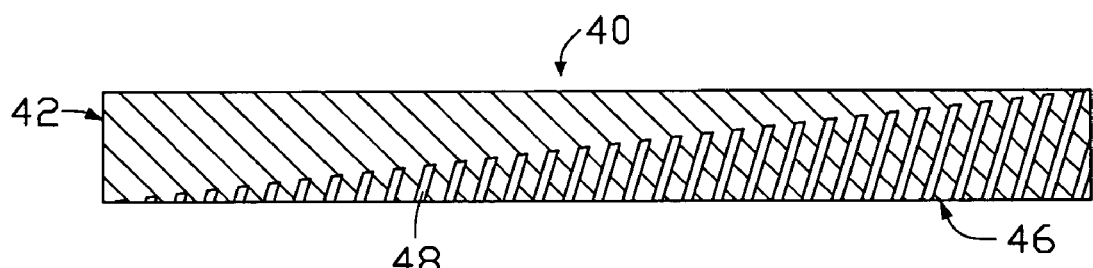
FIG. 5 is a schematic, side cross-sectional view of a light guide plate according to a fourth embodiment of the present invention.

FIG. 5 is a schematic, side cross-sectional view of a light guide plate according to a fourth embodiment of the present invention. The light guide plate 40 is similar to the first embodiment. However, a plurality of blind holes 48 are defined in the light guide plate 40, with open ends of all of the holes 48 terminating at a bottom surface 46. The holes 48 are defined at a same oblique angle in relation to the bottom surface 46, with all the holes 48 being parallel to each other. The holes 48 are shallowest near a light incident surface 42. The holes 48 become progressively deeper with increasing distance away from the light incident surface 42.

Figure 6:
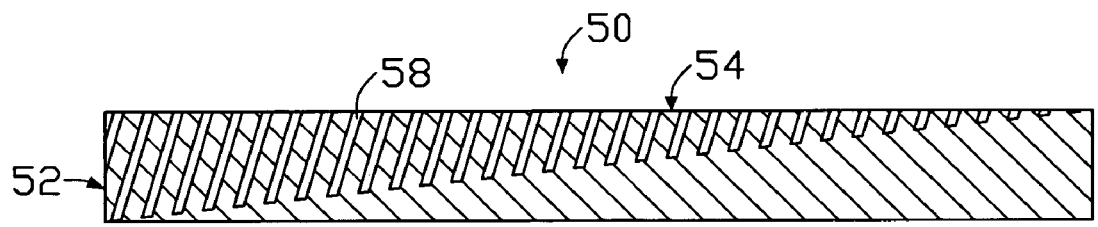
FIG. 6 is a schematic, side cross-sectional view of a light guide plate according to a fifth embodiment of the present invention.

FIG. 6 is a schematic, side cross-sectional view of a light guide plate according to a fifth embodiment of the present invention. The light guide plate 50 is similar to the light guide plate of the fourth embodiment. However, a plurality of blind holes 58 are defined in the light guide plate 50, with open ends of all of the holes 58 terminating at a light emitting surface 54. The holes 58 are deepest near a light incident surface 52. The holes 58 become progressively shallower with increasing distance away from the light incident surface 52.

Figure 7:
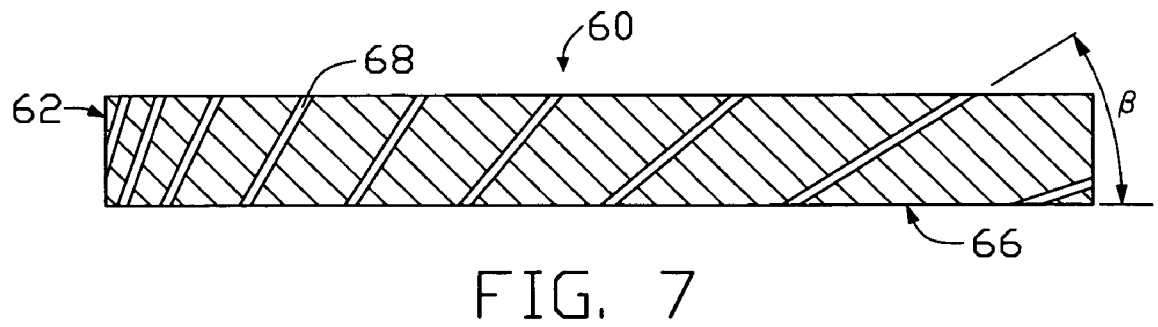
FIG. 7 is a schematic side cross-sectional view of a light guide plate according to a sixth embodiment of the present invention.

FIG. 7 is a schematic, side cross-sectional view of a light guide plate according to a sixth embodiment of the present invention. The light guide plate 60 is similar to the first embodiment. However, from a light incident surface 62 to an opposite end surface of the light guide plate 60, a plurality of through holes 68 are all nonparallel relative to each other. An angle β between the holes 68 and a bottom surface 66 of the light guide plate 60 progressively decreases with increasing distance away from the light incident surface 62. The angle β is in the range between 0 and 90 degrees.

Figure 8:
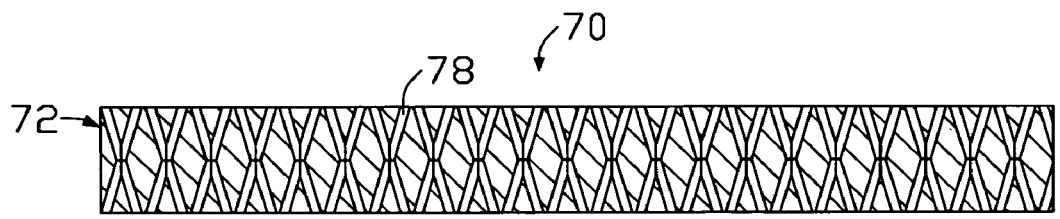
FIG. 8 is a schematic, side cross-sectional view of a light guide plate according to a seventh embodiment of the present invention.

FIG. 8 is a schematic, side cross-sectional view of a light guide plate according to a seventh embodiment of the present invention. The light guide plate 70 is similar to the first embodiment. However, pairs of adjacent, symmetric through holes 78 intersect along a same plane (not shown) that is perpendicular to a light incident surface 72 of the light guide plate 70.

Figure 9:
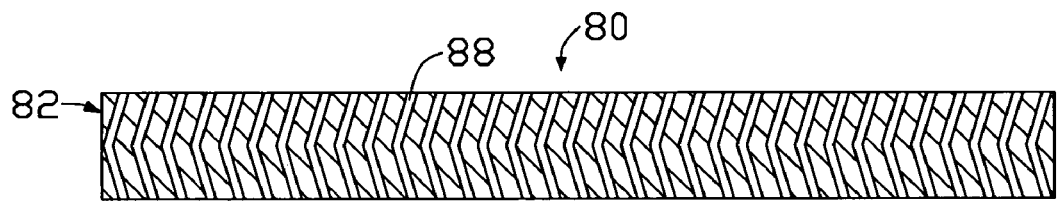
FIG. 9 is a schematic, side cross-sectional view of a light guide plate according to an eighth embodiment of the present invention.

FIG. 9 is a schematic, side cross-sectional view of a light guide plate according to an eighth embodiment of the present invention. The light guide plate 80 is similar to the first embodiment. However, a plurality of through holes 88 are bent. Elbow portions of all the through holes 88 are located along a same plane (not shown) that is perpendicular to a light incident surface 82 of the light guide plate 80. For each through hole 88, the elbow portion is the part of the through hole 88 that is nearest the light incident surface 82. The light guide plate 80 can be used in a double-sided backlight module (not shown).

Figure 10:
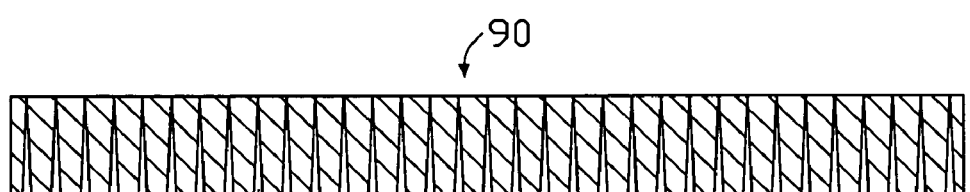
FIG. 10 is a schematic, side cross-sectional view of a light guide plate according to a ninth embodiment of the present invention.
Figure 11:
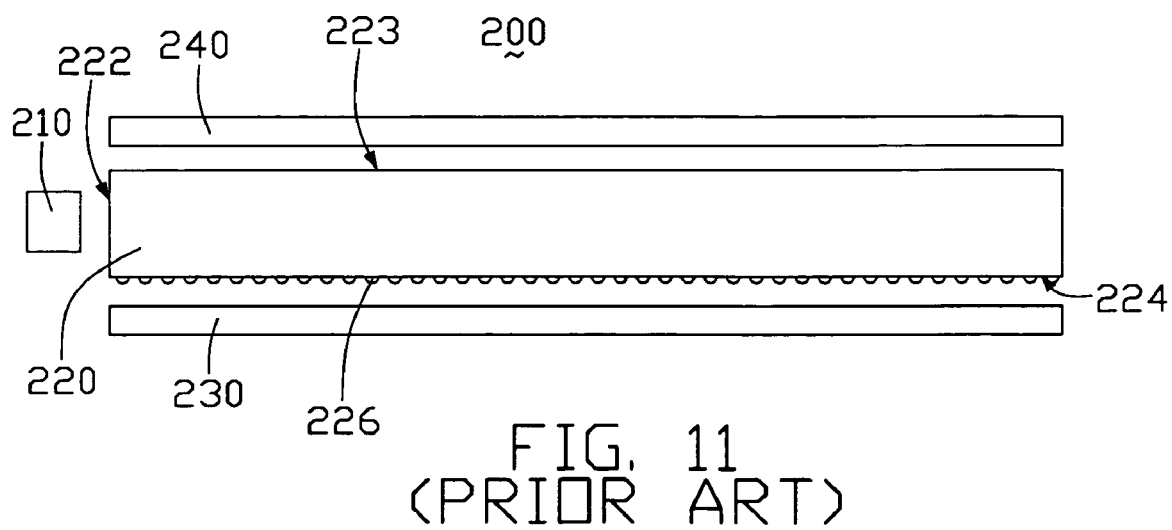
FIG. 11 is a schematic, side view of a conventional backlight module.

FIG. 10 is a schematic, side cross-sectional view of a light guide plate according to a ninth embodiment of the present invention. The light guide plate 90 is similar to the first embodiment. However, the light guide plate 90 includes a plurality of vertical, tapered blind holes 98. Open ends of all the holes 98 terminate at a bottom surface (not labeled) of the light guide plate 90.

In summary, distances traveled by some of the light beams in each of the above-described light guide plates 10, 20, 30, 40, 50, 60, 70, 80, 90 are shortened, and the loss of light energy is reduced. This enables each light guide plate to provide a high ratio of light utilization. Additionally, the through holes of each light guide plate reduce the weight of the light guide plate.

In alternative embodiments, the shape of the holes can be pyramidal. The light emitting surface of each light guide plate can be a rough surface. The bottom surface of each light guide plate can include a plurality of light diffusion dots. Each light guide plate can be wedge-shaped.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A light guide plate, comprising:
   a light incident surface;
   a top surface adjacent the light incident surface;
   a bottom surface opposite to the top surface; and
   a plurality of holes;
   wherein each hole is slanted at an oblique angle in relation to the bottom surface and includes two open ends terminating at the top surface and the bottom surface respectively.

2. The light guide plate as claimed in claim 1, wherein the holes are parallel to each other.

3. The light guide plate as claimed in claim 2, wherein the holes have a same diameter, and are spaced from each other at a constant pitch.

4. The light guide plate as claimed in claim 1, wherein diameters of the holes progressively decrease in size with increasing distance away from the light incident surface.

5. The light guide plate as claimed in claim 1, wherein a pitch between adjacent holes progressively decreases with increasing distance away from the light incident surface.

6. The light guide plate as claimed in claim 5, wherein the holes progressively increase in depth with increasing distance away from the light incident surface.

7. The light guide plate as claimed in claim 1, wherein the holes progressively decrease in depth with increasing distance away from the light incident surface.

8. The light guide plate as claimed in claim 1, wherein angles between the holes and the bottom surface progressively decrease with increasing distance away from the light incident surface.

9. The light guide plate as claimed in claim 1, wherein the holes are tapered.

10. The light guide plate as claimed in claim 1, wherein the holes are substantially column-shaped.

11. The light guide plate as claimed in claim 1, wherein the light guide plate is generally rectangular.

12. The light guide plate as claimed in claim 1, wherein the light guide plate is wedge-shaped.

13. A light guide plate, comprising:
- a light incident surface;
- a light emission surface adjacent the light incident surface;
- a bottom surface opposite to the light emission surface; and
- a plurality of bent holes, wherein each bent hole comprises a first portion oriented in a first direction and a second portion oriented in a second direction different from the first direction, and further comprises one open end terminating at the emission surface or the bottom surface.

14. The light guide plate as claimed in claim 13, wherein each bent hole comprises an elbow portion, and the elbow portion is the part of each bent hole that is nearest the light incident surface.

15. The light guide plate as claimed in claim 13, wherein each bent hole has two open ends, which terminate at the light emission surface and the bottom surface respectively.

* * * * *